United States Patent
Inoue

[19]

[11] Patent Number: 6,144,804

[45] Date of Patent: Nov. 7, 2000

[54] CAMERA WITH VISUAL LINE DETECTION CAPABILITY

[75] Inventor: Hideya Inoue, Yokohama, Japan

[73] Assignee: Nikon Corporation, Tokyo, Japan

[21] Appl. No.: 08/621,517

[22] Filed: Mar. 25, 1996

Related U.S. Application Data

[63] Continuation of application No. 08/143,401, Oct. 29, 1993, abandoned.

[30] Foreign Application Priority Data

Oct. 30, 1992 [JP] Japan .................................. 4-293378

[51] Int. Cl.⁷ ............................. G03B 13/36; G03B 7/00; G03B 17/00; G03B 17/40
[52] U.S. Cl. ........................ 396/51; 396/121; 396/130; 396/137; 396/224; 396/234; 396/56; 396/264; 396/265
[58] Field of Search .................................. 354/410, 400, 354/402, 219, 195.1; 396/51, 130, 264, 265, 56–59, 121, 224, 233, 234, 137

[56] References Cited

U.S. PATENT DOCUMENTS

| | | | |
|---|---|---|---|
| 4,574,314 | 3/1986 | Weinblatt | 354/400 |
| 5,214,466 | 5/1993 | Nagano et al. | 354/400 |
| 5,239,337 | 8/1993 | Takagi et al. | 354/219 |
| 5,245,381 | 9/1993 | Takagi et al. | 354/219 |
| 5,296,888 | 3/1994 | Yamada | 354/402 |

*Primary Examiner*—W. B. Perkey

[57] ABSTRACT

A camera which has a visual line detection device to detect the visual line of a photographer, and which inhibits visual line detection and automatic focus adjustment operations when these operations are unnecessary. Visual line detection may be inhibited, for example, when a manual focus lens is used in the camera, or when a self-timer mode is being used and the photographer is not observing the camera viewfinder. In these types of situations, the visual line detection, focus detection region selection based upon the visual line detection result and focus adjustment action based upon the visual line detection result are inhibited, thereby preventing useless consumption of electric power, and preventing focusing on undesired objects.

15 Claims, 6 Drawing Sheets

CAMERA WITH VISUAL LINE DETECTION CAPABILITY

This application is a continuation of application Ser. No. 08/143,401, filed Oct. 29, 1993, now abandoned.

BACKGROUND OF THE INVENTION

1. Field of the Invention

The present invention relates to a camera which selects a focus detection region while performing visual line detection, and more particularly to a camera which inhibits visual line detection and automatic focus adjustment when these operations are unnecessary.

2. Description of the Related Art

Cameras are known which have a visual line detection device to determine the visual line of a photographer. For example, a camera is disclosed in Japanese Laid-Open Patent Publication No. 1-274736 ("JP-A-1-274736") in which the visual line of a photographer is detected while observing a viewfinder picture plane through an eyepiece lens. After the visual line of the photographer has been determined, a focus detection region in the photographic field may be selected based upon the result of the visual line detection. Focus adjustment of a photographic lens is then performed in order to focus the lens on the subject in the selected focus detection region. Further, by weighting the photometric results in the selected focus detection region, photographic values (e.g., stop and shutter speed) are determined. Accordingly, a camera having the type of visual line detection device described above will automatically focus on a subject being scrutinized in the viewfinder picture plane, among plural subjects in the picture plane, and photography of the subject with appropriate exposure occurs.

The above-described type of visual line detection device is very useful in simplifying the operation of the camera. However, there are times when focus adjustment is performed without using the results of visual line detection. At these times, if visual line detection and focus adjustment based upon the visual line detection are performed, not only is electrical supply current wastefully consumed, but also the focus may not even be on the desired subject. For this reason, when focus adjustment occurs without using the results of visual line detection, it is desirable that the visual line detection action and the focus adjustment action based on the visual line detection be inhibited when these operations are not necessary.

A camera is disclosed in Japanese Laid-Open Patent Publication No. 4-267230 ("JP-A-4-267230") which discloses inhibiting visual line detection when a manual focus operation occurs. However, there are many other situations in which focus adjustment is performed without using the results of the visual line detection.

SUMMARY OF THE INVENTION

It is therefore an object of the present invention to provide a camera which has visual line detection capability and which has the ability to inhibit visual line detection and automatic focus adjustment in situations in which these operations are unnecessary, thereby preventing wasteful consumption of electrical supply current and undesired focus adjustments.

Additional objects and advantages of the invention will be set forth in part in the description which follows, and, in part, will be obvious from the description, or may be learned by practice of the invention.

To achieve the above-described objects of the present invention, a camera is provided which includes a visual line detection device, and which inhibits the selection of a focus detection region based upon the result of a visual line detection. More specifically, when a camera operational mode is set in which visual line detection is unnecessary, e.g., a continuous photography mode, focus is adjusted by selecting a focus detection region unrelated to the detected visual line. Accordingly, even if the visual line detection mode is not cancelled, visual line detection is automatically inhibited. Undesirable consumption of electric power source current due to unnecessary visual line detection is prevented, and focusing on undesired subjects may also be prevented.

The above-described objects are also achieved according to the present invention, by providing a camera in which a focus adjustment operation which is based on the visual line detection result is inhibited when it is determined that automatic focusing is unnecessary. Specifically, when a manual focus lens is installed, and when the manual focus mode is set, and focus lock is in operation, the focus adjustment operation will be inhibited.

BRIEF DESCRIPTION OF THE DRAWINGS

These and other objects and advantages of the invention will become apparent and more readily appreciated from the following description of the presently preferred embodiments, taken in conjunction with the accompanying drawings, of which.

DETAILED DESCRIPTION OF THE PREFERRED EMBODIMENTS

Figure 1:
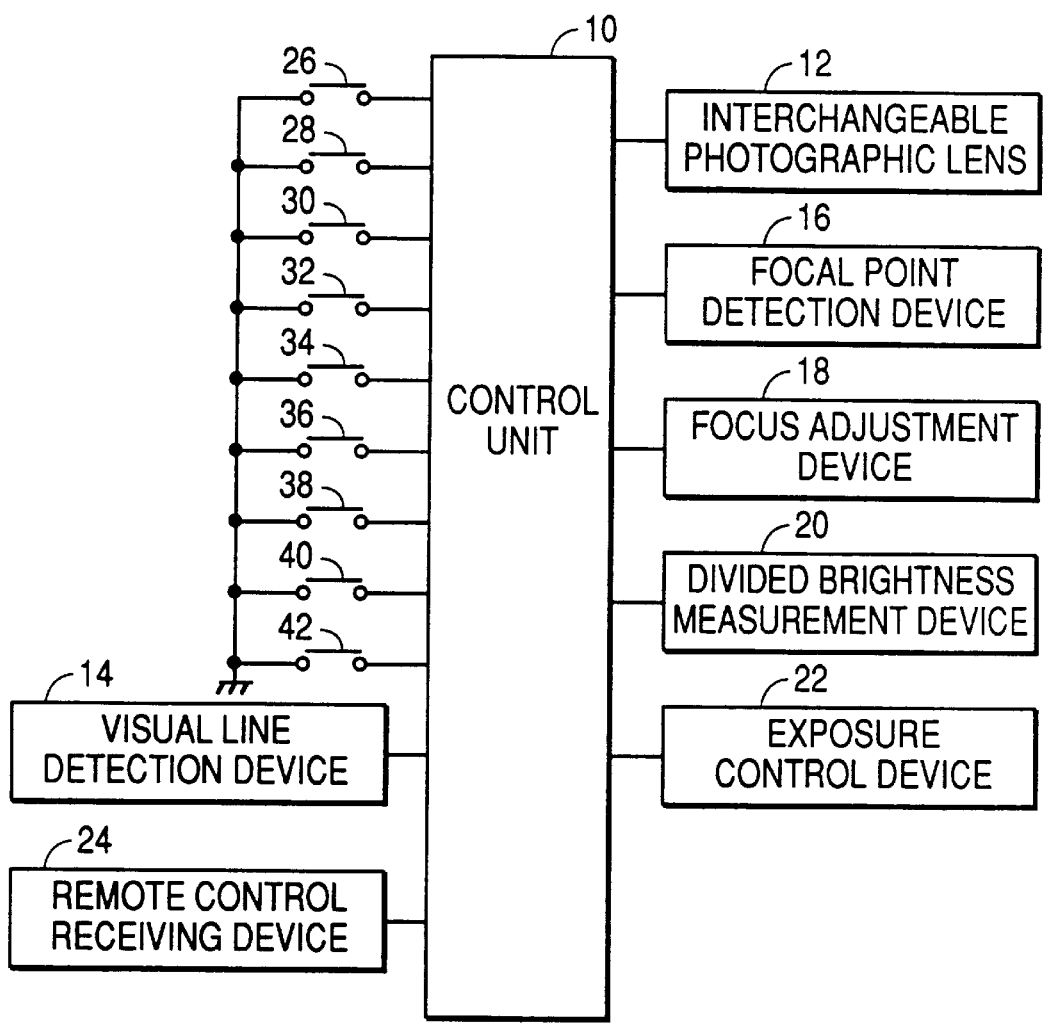
FIG. 1 is a block diagram showing camera circuitry in accordance with a first embodiment of the present invention.

Reference will now be made in detail to the present preferred embodiments of the invention, examples of which are illustrated in the accompanying drawings. Like reference numerals refer to like elements throughout.

FIG. 1 is a block diagram showing camera circuitry for a camera which has visual line detection capability, and which inhibits visual line detection in situations where it is unnecessary, in accordance with a first embodiment of the present invention. The preferred embodiment of the present invention is described with application to a single lens reflex (SLR) camera.

The control circuitry includes a control unit 10 which controls the operations performed by various elements located in the camera. An interchangeable photographic lens 12 is installed on the camera body (not shown). The interchangeable photographic lens 12 may be any one of a number of autofocus (AF) lenses, or alternatively, the interchangeable photographic lens 12 may be a manual focus (MF) lens for which autofocusing is impossible. Information indicating the type of photographic lens which has been installed (i.e., an AF or MF lens) is input via a contact point disposed on a lens mount portion (not shown) of the lens body.

A visual line detection device 14 detects a region in a viewfinder picture plane (not shown) which a photographer is scrutinizing. The visual line detection device may be a well-known visual line detection device, for example, a device similar to that disclosed in JP-A-1-274736. The visual line detection device 14 detects the position of the visual line of the photographer observing a particular region of the viewfinder picture plane among plural predetermined regions in the picture plane through an eyepiece lens (not shown). The result of the visual line detection is input to the control unit 10. A focal point detection device 16 makes possible the focus detection in the plural regions used in the visual line detection (the plural regions are referred to as "focal point detection regions" below). The focal point detection device 16 may be, e.g., a well-known through the lens (TTL) phase difference wide region focal point detection device. A focus adjustment device 18 drives the focusing optical system of an AF lens with an electric motor (not shown) based upon the focal point detection result from the focal point detection device 16.

A well-known divided brightness measurement device 20 is a photometric device which measures the brightness in respective regions of a photographic field divided into plural regions. The divided brightness measurement device 20 outputs photometric signals relating to the subject brightness in the plural regions of the photographic field. The control unit 10 calculates exposure values based upon the photometric signals output by the divided brightness measurement device 20. An exposure control device 22 drives a camera shutter (not shown) based upon the calculated exposure values in order to perform control of exposure. A remote control receiving device 24 receives optical signals from an accessory remote control unit 54 (FIG. 2C). The remote control receiving device 24 performs a remote release of the camera. When a remote control mode is set, after a release button (not shown) on the camera body has been fully depressed, when a release button on the remote control unit 54 is operated, a predetermined optical signal is generated by the remote control unit 54. The optical signal is received by the remote control receiving device 24, causing the control unit 10 to perform shutter release of the camera.

A group of switches 26–42 are connected to the control unit 10 in order to provide respective signals to the control unit 10 which begin various camera operations. These switches include an electrical supply switch 26, a switch 28 which may be a half-depression switch or alternatively a touch sensor type switch, a full-depression switch 30, a visual line detection mode switch 32, a self-timer switch 34, a remote control switch 36, a film advance mode switch 38, a manual focus switch 40, and a focus lock switch 42.

The electrical supply switch 26, is set ON when electric power is supplied to the devices in the camera body, which are therefore operational. The electrical supply switch 26 may be a slide switch which switches between ON and OFF positions, or it may be a momentary type switch which turns ON and OFF every time it operates. The switch 28, when it is a half-depression switch, is set ON when the release button is half depressed. However, if the switch 28 is a touch sensor switch, the switch 28 is set ON when a touch sensor is touched by an operator. The full-depression switch 30 is set ON when the release button is fully depressed. When the full-depression switch 30 is ON, the half-depression switch 28 also maintains its ON state. The visual line detection mode switch 32 may be set by the photographer according to whether or not the visual line detection is to be performed by the visual line detection device 14. When the visual line detection mode switch 32 is ON, the visual line detection mode is set. When the visual line detection mode switch 32 is OFF, the visual line detection mode is cancelled. The self-timer switch 34 sets a self-timer (not shown). The remote control switch 36 sets a remote control mode. The control unit 10 sets the self-timer mode whenever the self-timer switch 34 is ON, and sets the remote control mode whenever the remote control switch 36 is ON.

The film advance mode switch 38, when ON, causes the control unit 10 to cycle through various modes of photography, e.g., the one frame photography mode, the continuous low speed photography mode, and the continuous high speed photography mode. The continuous low speed photography mode and the continuous high speed photography mode are modes in which, while the full-depression switch 30 is ON, photography and film winding are continuously performed. During continuous low speed photography mode, film winding is performed at a comparatively slow speed, and during the continuous high speed photography mode, film winding is performed at a comparatively high speed.

The manual focus switch 40 sets the manual focus (MF) mode. The MF mode is a mode in which manual operation of a lens focus ring on a photographic lens, or a switch (not shown) on the camera, drives the focusing optical system of the photographic lens 12, and during this mode of operation, the operation of the visual line detection device 14, the focal point detection device 16, and the focus adjustment device 18 are inhibited. In the manual focus mode, the focusing optical system may be driven manually by a mechanical linkage to the lens focus ring when the lens focus ring is adjusted, or by a motor which drives the focusing optical system when the lens focus ring is adjusted. The focus lock switch 42 is a switch which inhibits the drive of the focusing optical system of the interchangeable photographic lens 12 when it is set ON, and the focusing optical system is fixed in the lens position at which it was set just when the focusing lock switch 42 is set ON. The focusing lock switch 42 is maintained in the ON state while its operation is applied.

Figure 2A:
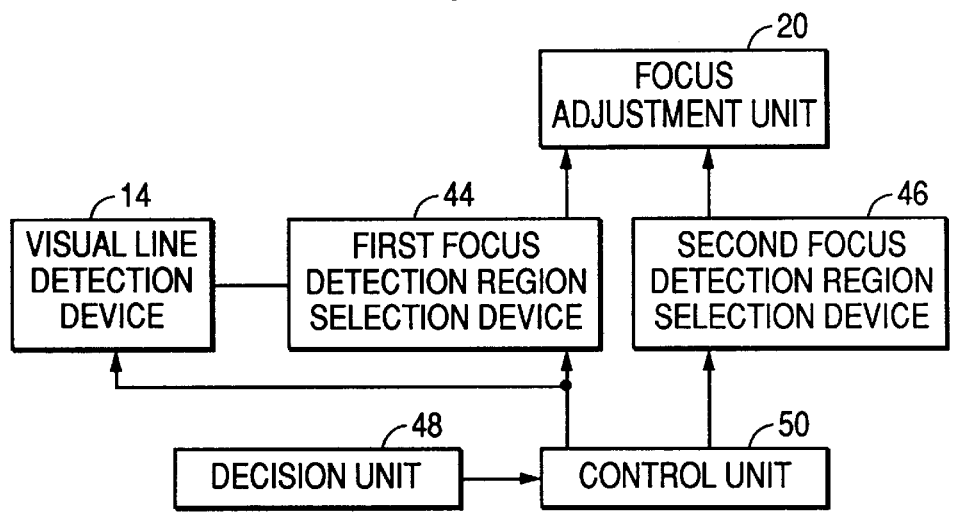
FIGS. 2A–2C are block diagrams showing the operation of the camera having visual line detection capability in accordance with the preferred embodiments of the present invention.
Figure 2B:
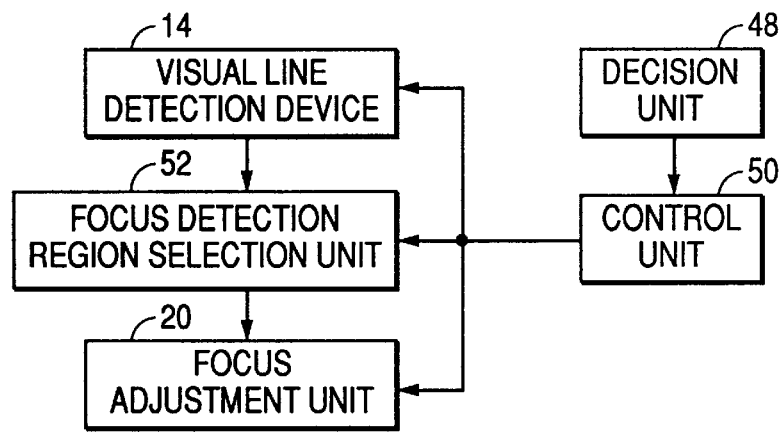
Figure 2C:
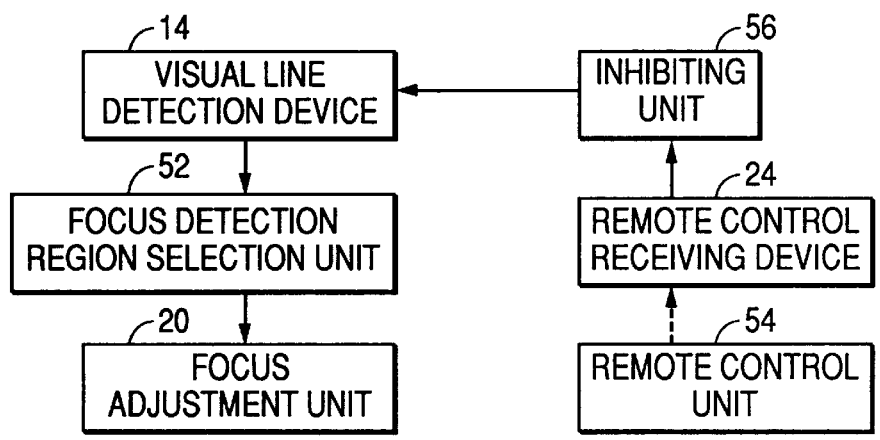

FIGS. 2A–2C are block diagrams showing the operation of a camera in accordance with the preferred embodiments of the present invention. FIG. 2A is a block diagram of a system which allows a focus detection region to be selected which is not based upon visual line detection in situations in which visual line detection is unnecessary. The system includes a visual line detection device 14 to detect the visual line of a photographer observing a viewfinder picture plane through an eyepiece lens. A first focus detection region selection device 44 selects a focus detection region from among plural focus detection regions in a photographic field based upon the output of the visual line detection device 14. A second focus detection region selection device 46 selects a focus detection region, unrelated to the output of the visual line detection device 14. A decision unit 48 decides whether or not a first operating mode or a second operating mode, other than the first operating mode, is selected as the operating mode of the camera. The second mode may be, for example, a mode of continuous high speed photography.

A control unit 50 controls the operation of both the visual line detection device 14 and the first focus detection region selection device 44 to cause them to operate when the first mode is selected by the decision unit 48. When the second mode is selected by the decision unit 48, the control unit 50 inhibits the operation of both the visual line detection device 14 and the first focus detection region selection device 44, and causes the second focus detection region selection device 46 to operate. Specifically, visual line detection is not performed, and the focus adjustment is performed such that a subject is focused without relation to the detected visual line. For example, when the mode corresponds to continuous high speed photography, the subject often moves and it is desirable that the decision unit select the second mode. With a single lens reflex camera the raising and lowering of the mirror (not shown) is frequently performed in the continuous high speed photography mode, and it is difficult to establish a visual line. Accordingly, it is desirable that the second mode be selected by decision unit 48. A focus adjustment unit 20 drives the photographic lens 12 so as to focus on a subject in the focus detection region selected by one of the first and second focus detection region selection devices 44, 46.

FIG. 2B is a block diagram of a system which performs visual line detection and which may inhibit visual line detection and automatic focus detection action when automatic focus detection is unnecessary. As seen in FIG. 2B, the system includes a visual line detection device 14. A focus detection region selection device 52 selects one of plural focus detection regions in a photographic field based upon the output of the visual line detection device 14. Focus adjustment unit 20 drives the photographic lens 12 so as to focus on a subject in the focus detection region selected by the focus detection region selection device 52.

A decision unit 48 decides whether or not an automatic focus detection is necessary. The decision that automatic focus detection is unnecessary is made, for example, when a manual focusing mode is installed, or when manual focusing is set, or when a focus lock operation is in force. Control unit 50 controls the operation of the visual line detection unit 14, the focus detection region selection unit 52, and the focus detection unit 20 when it is decided by the decision unit 48 that automatic focus adjustment is necessary. However, when it is decided that automatic focus adjustment is not necessary, the control unit 50 inhibits the operation of the focus adjustment unit 20 based upon at least the visual line detection result. Further, the operation of the focus adjustment unit 20, the operation of the visual line detection unit 14, and the operation of the focus detection region selection device 52 may be inhibited. However, when the result of the visual line detection is reflected in the exposure calculation, specifically, in the case in which an exposure calculation is performed such that the subject of the focus detection region selected by the visual line detection is photographed, the visual line detection unit 14 is operated.

FIG. 2C is a block diagram of a system which performs visual line detection and which may inhibit visual line detection when a remote release operation is performed. As seen in FIG. 2C, the system includes an inhibiting unit 56 to inhibit the action of the visual line detection device 14 during an interval from the commencement of self-timer photography timing until shutter release is performed. A remote control unit 54 is also provided to generate a release signal for remote release of the camera, and a remote control receiving unit 24 receives the release signal from the remote control unit 54. The inhibiting unit 56 inhibits the operation of the visual line detection device 14 during the interval from the instant when it becomes possible to receive a release signal from the receiving unit 24, until the release signal is generated by the remote control unit 54.

Figure 3:
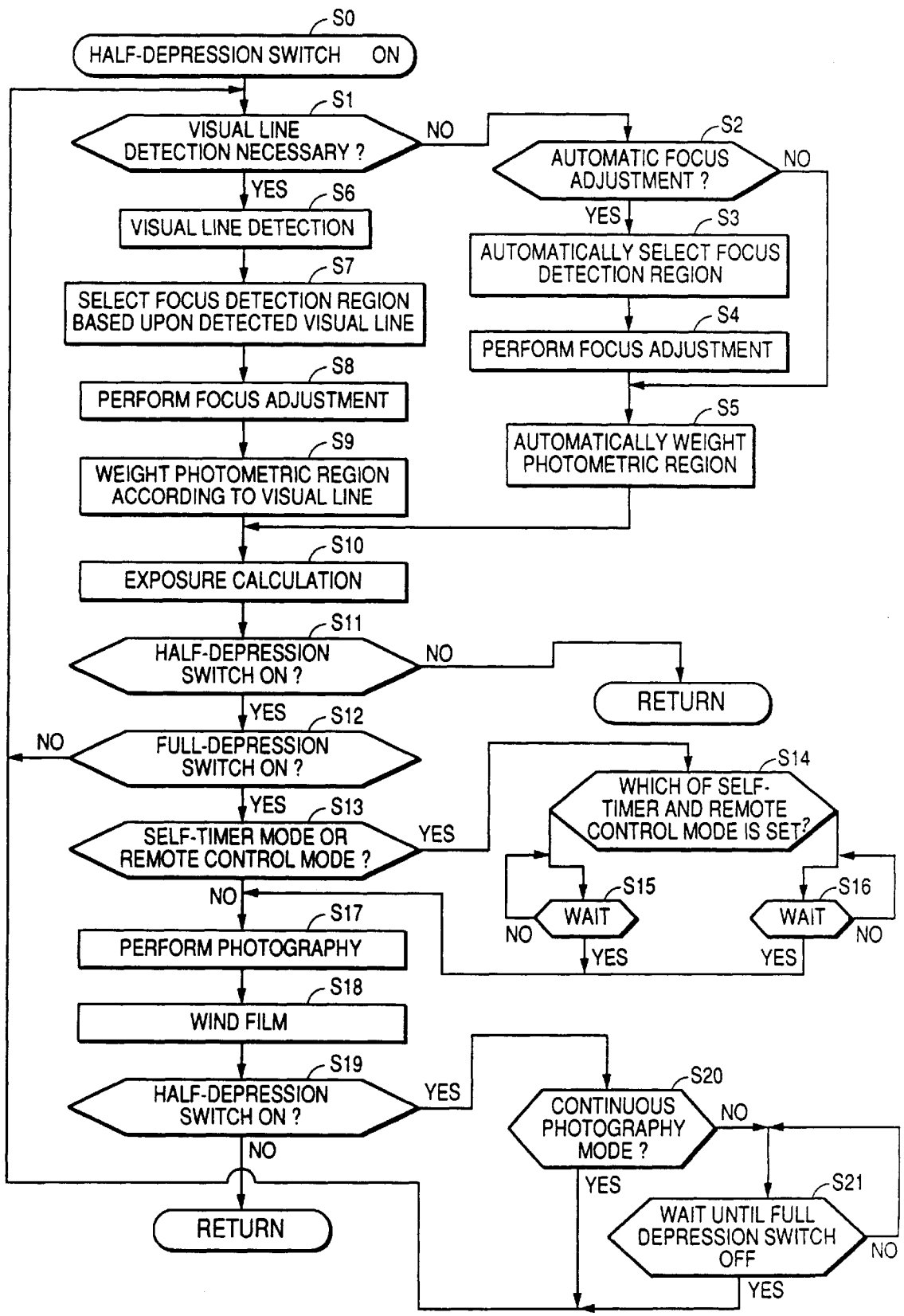
FIG. 3 is a flow chart illustrating an example of a control routine for controlling a camera in accordance with the first embodiment of the present invention.

FIG. 3 is a flowchart showing an example of a sequence of control in a camera in accordance with a first embodiment of the present invention. As seen in FIG. 3, the control routine starts in step S0 when the half-depression switch 28 is set ON. Next, in step S1, it is determined whether visual line detection is necessary. Specifically, according to the preferred embodiments, visual line detection is unnecessary and, therefore, focus detection and exposure calculation are performed without performing visual line detection in at least the following situations:

(1) The visual line detection mode has been cancelled.

(2) The manual focus (MF) lens is installed as the interchangeable photographic lens 12.

(3) The continuous high speed photography mode is set.

(4) The manual focus (MF) mode is set.

(5) The focus lock switch 42 is ON.

When one of the conditions (1)–(5) set forth above occurs, it is determined that visual line detection is not necessary, and the control routine proceeds to step S2. In step S2, it is determined whether or not automatic focus adjustment is to be performed. When a MF lens is installed (2), or the MF mode is set (4), or in the situation in which the focus lock switch 42 is ON (5), step S2 is negative, automatic focus adjustment is not performed, and control proceeds to step S5. However, when an AF lens is installed and the MF mode is not set, and the visual line detection mode is cancelled (1), or in the situation when the high-speed continuous photography mode is set (3), the program proceeds to step S3. In step S3, focus detection information relating to a selected region among the plural focus detection regions is used for operating the focal point detection device 16. Normally, the focus detection region corresponding to the closest detection information is selected. However, for example, a region may be selected corresponding to average information.

Continuing in step S4, the focus adjustment device 18 is operated based upon the focus detection information corresponding to the above-described selected focus detection region. The focus adjustment device 18 drives a focusing motor (not shown) which drives the focusing optical system of the interchangeable photographic lens 12 so as to focus on the subject in the selected focus detection region.

In step S5, photometric signals corresponding to the plural regions are output by the divided brightness measurement device 20 and, the signals are respectively input to the control unit 10. Further, a predetermined weight is assigned the signals corresponding to the selected region. The control routine then proceeds to step S10.

However, when none of the conditions (1)–(5) set forth above occurs, it is determined in step S1 that visual line detection is necessary, and the program proceeds to step S6. In step S6, the focal point detection device 16 is operated and focus detection is performed, the results of which are input to control unit 10. In step S7, based upon the visual line detection result, it is determined which focus detection region the photographer is scrutinizing, the scrutinized region is selected, and control proceeds to step S8. In step S8, the focusing optical system is driven such that the interchangeable photographic lens 12 is focused on the subject in the selected focus detection region. Next, in step S9, photometric signals are output by the divided brightness measurement device 20 and a predetermined weight is assigned to the signals corresponding to the selected focus detection region based upon detected visual line.

Proceeding to step S10, exposure values are calculated using the photometric signals corresponding to photometric region which was automatically weighted in step S5, or exposure values are calculated for the region to which weights were assigned in step S9. In step S11, it is determined whether the half-depression switch 28 is ON. When it is determined that the half-depression switch 28 is ON, the program proceeds to step S12. However, when it is determined in step S11 that the half-depression switch 28 is OFF, the control routine returns to a main routine. In step S12, it is determined whether the full-depression switch 30 is ON. When it is determined that the full-depression switch 30 is OFF, control returns to step S1. However, when it is determined that the full-depression switch 30 is ON, control proceeds to step S13. In step S13, it is determined whether either the self-timer mode or the remote control mode is set. When it is determined that either the self-timer mode or the remote control mode is set, the control routine proceeds to step S14 where it is determined which of the two modes (self-timer mode or remote control mode) is set. When it is determined in step S14 that the self-timer mode is set, control proceeds to step S15 where the control routine waits until a predetermined time period has elapsed. When it is determined in step S14 that the remote control mode is set, the control routine proceeds to step S16 where control waits until a predetermined optical signal is received. After the control routine has waited the predetermined time period in step S15, or the control routine has received the predetermined optical signal in step S16, control then proceeds to step S17.

In step S17, the exposure control device 22 drives the stop and shutter based upon the exposure values calculated in step S10, and photography is performed. Next, in step S18, a winding motor (not shown) is driven to advance the film by one frame. When in the continuous high speed photography mode, the film is wound at high speed. When in the continuous low speed photography mode the film is wound at a low speed. Proceeding to step S19, it is determined whether the half-depression switch 28 is ON. When it is determined that the half-depression switch is OFF, the program returns to the main routine. However, when it is determined that the half-depression switch is unchanged in the ON position, control proceeds to step S20. In step S20, it is determined whether a continuous (high or low speed) photography mode is set. When it is determined that the continuous photography mode is set, the program proceeds directly to step S1. However, if the determination in step S20 is negative, control proceeds to step S21 where the control routine waits until the full-depression switch 30 is OFF. When the full-depression switch 30 is OFF the control routine then returns to step S1.

Therefore, according to the control sequence described above, when the release button is operated to a half-depressed position, and the half-depression switch 28 is set ON, a determination is made as to whether or not visual line detection is necessary. When the conditions set forth in (1) (the visual line detection mode has been cancelled) or (3) (the continuous high speed photography mode is set), the visual line detection operation by the visual line detection device 14 is inhibited, and a focus detection region is selected which is unrelated to a visual line detection result (e.g., a focus detection region corresponding to a closest subject is selected). Focus adjustment is then performed to focus on the subject in the selected focus detection region, and exposure values are calculated with weights applied to the photometric signals corresponding to the selected focus detection region.

More specifically, when the visual line detection mode has been cancelled, as in (1) above, visual line detection by the visual line detection device 14 is inhibited because the photographer has selected a mode in which focus adjustment and exposure calculation are performed not using the visual line detection result. Further, in the situation in which the continuous high speed photography mode is set, corresponding to (3) above, visual line detection by the visual line detection device 14 is inhibited because a principal subject to be photographed may be a moving subject, and, because the up and down motion of the mirror in an SLR camera is repeated at short time intervals, it is difficult to fix the visual line on the principal subject. Accordingly, in the above-described situations, since the visual line detection result is not reflected in the focus adjustment or in the exposure calculation, the visual line detection operation is inhibited.

When conditions (2) or (4) above are satisfied, specifically, when an MF lens is installed as the interchangeable photographic lens 12 (2), or when the MF mode has been set (4), since driving of the photographic lens is performed upon manual operation, performance of autofocus adjustment, based on the visual line detection result, becomes impossible. Accordingly, in these situations, the visual line detection action and a focus adjustment action based upon the detected visual line are completely useless, and, therefore, these actions are inhibited.

Furthermore, in the situation in which the focus lock switch 42 is set ON, corresponding to condition (5) above, since the photographic lens is fixed at the position at which it was set when the focus lock switch 42 is set ON, the visual line detection action is useless and it is therefore inhibited. Additionally, the focus adjustment action is also inhibited when the photographic lens is fixed.

When none of the conditions (1)–(5) are met, visual line detection is performed in response to half-depression of the release button, and a focus detection region is determined based upon the result of visual line detection. Then, lens adjustment is performed to focus on the subject in the selected focus detection region, and in addition, the photometric signal in this selected region is weighted, and the exposure value is calculated. Accordingly, the subject which the photographer is scrutinizing through the viewfinder, among plural subjects in the photographic field, is automatically brought into focus, and a photograph of this subject is taken at the appropriate exposure.

When an operation of full-depression of the release button is performed after half-depression, the visual line detection and focus adjustment are inhibited. The photographic lens 12 becomes fixed at the position it was located when the release button was initially fully depressed, and the effects described below are obtained.

Specifically, when, e.g., the self-timer mode is selected accompanying the operation of full-depression of the release button, a self-timer is started, and after a predetermined period of time an exposure is performed. However, there are many situations in which the photographer does not observe through the viewfinder during the self-timing operation.

Further, when the remote control mode is set, normally, the photographer has fully depressed the release button on the camera, and when the release button of the remote controller is operated, an optical release signal is emitted from the remote control unit 54. The optical release signal is received by the remote control receiving device 24 on the camera, and photography is performed. Accordingly, during the interval between the full-depression operation of the release button on the camera, and the release operation of the remote control unit 54 (specifically, the interval starting from the instant when the remote control receiving device 24 becomes able to receive the release signal, until the release signal is actually received) there are many situations in which the photographer does not observe the viewfinder.

During these situations in which the photographer does not observe the viewfinder, when visual line detection is performed an erroneous detection results, and when focus adjustment is performed based upon the erroneous detection result, there is a danger that the desired subject will not be in focus.

However, according to the preferred embodiments, during the self-timer mode of operation, or during the waiting time prior to performing a release operation via remote control, visual line detection and focus adjustment are not performed, and the desired subject can be precisely focused.

Figure 4:
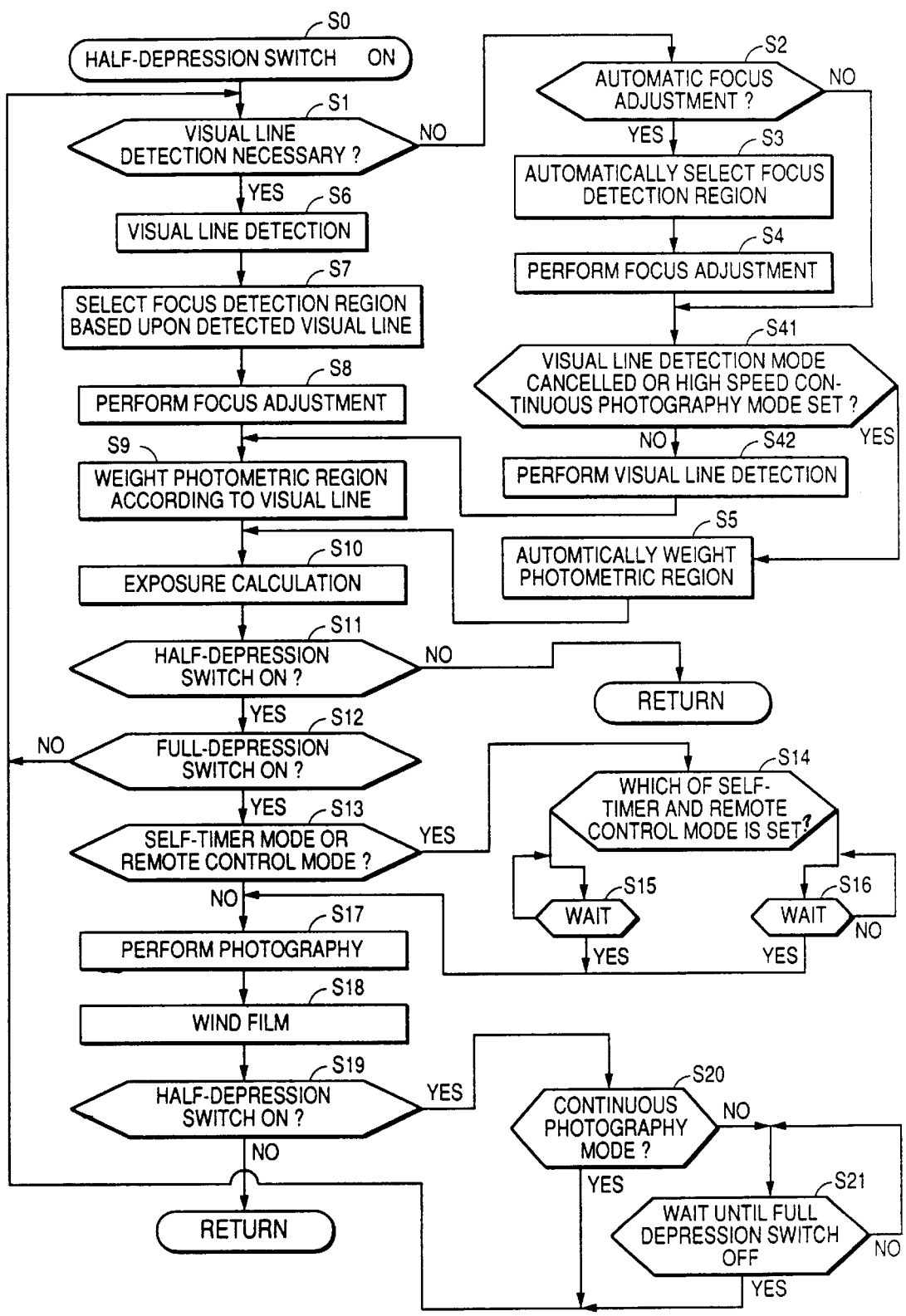
FIG. 4 is a flow chart illustrating an example of a control routine for controlling a camera in accordance with modification of the first embodiment of the present invention.

FIG. 4 is a flowchart illustrating and example of a control routine in accordance with a modification of the first embodiment of the present invention. Steps which are the same as, or similar to, steps set forth in the control sequence illustrated in FIG. 3 are referred to by like reference characters. More specifically, according to the second embodiment of the present invention, steps S41 and S42, which occur after step S4, are supplementary to the process shown in FIG. 3.

Referring now to FIG. 4, after focus adjustment occurs in step S4, in step S41, it is determined whether either the visual line detection mode is cancelled (1) or the continuous high speed photography mode is set (3). When step S41 is affirmative, control proceeds to step S5 and step S5 and the operations following corresponding to those described with respect to FIG. 3, are performed. However, when step S41 is negative, control proceeds to step S42 and the visual line detection device 14 is operated in order to perform visual line detection. The program then proceeds to step S9, and step S9 and the following steps are performed in the manner described previously with respect to FIG. 3.

Therefore, according to the control routine shown in FIG. 4, when an MF lens is installed (2) or when the MF mode is set (4), or when the focus lock switch 42 is set ON (5), the focus adjustment action by the focus adjustment device 18 is inhibited. However, the selection of a focus detection region is performed based upon the visual line detection and its detection result. Exposure calculation is then performed, and the photometric signal corresponding to the selected focus detection region is given appropriate weight. Accordingly, the visual line detection result is reflected in the exposure calculation, and the principal subject to be photographed at an appropriate exposure can be selected based on the visual line detection.

Figure 5:
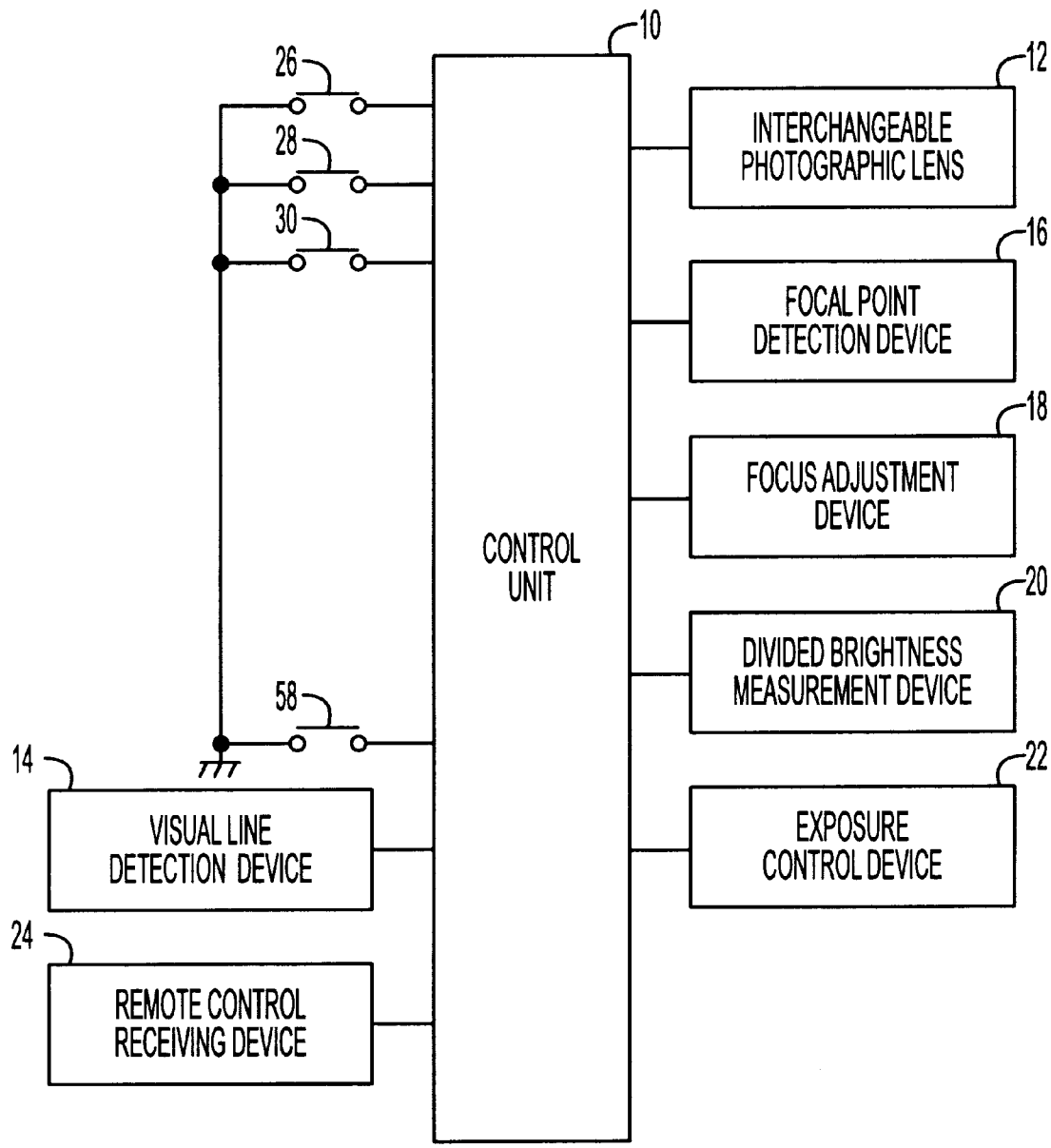
FIG. 5 is a block diagram showing camera circuitry in accordance with a second embodiment of the present invention.

FIG. 5 is a block diagram showing camera circuitry for a camera with visual line detection capability in accordance with a second embodiment of the present invention. Like elements in the first and second embodiments are referred to by like reference numerals. Further, like elements in the first and second embodiments operate in the same manner, and a description of these elements will not be repeated here.

As seen in FIG. 5, an automatic exposure lock (AE-L) switch 58 is operatively connected to the control unit 10. While the automatic exposure lock switch 58 is set ON, the automatic exposure lock mode is set.

Figure 6:
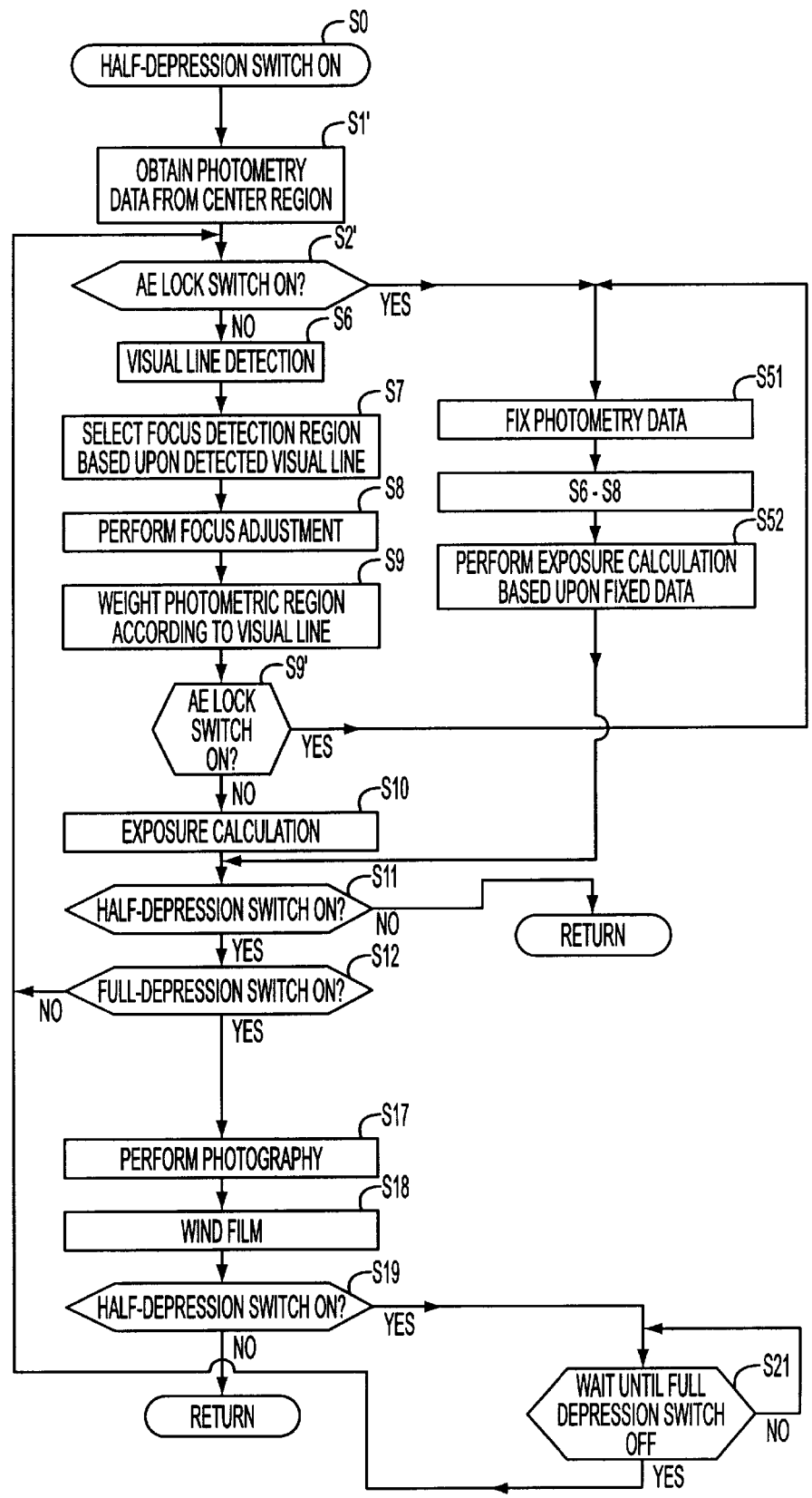
FIG. 6 is a flowchart showing an example of a control routine for controlling a camera in accordance with the second embodiment of the present invention.

FIG. 6 is a flowchart illustrating an example of a control routine for controlling camera operations in accordance with the second embodiment of the present invention. Steps in the control routine which are the same as, or similar to, steps set forth in the control sequence illustrated in FIG. 3 are referred to by like reference characters. Further, the steps referred to by like reference characters are performed in the same manner as described with respect to FIG. 3, and, therefore, a description of these steps will not be repeated here.

Referring now to FIG. 6, after the control routine begins in step S0 when the half-depression switch 28 is ON, control proceeds to step S1' where photometry data is obtained corresponding to the center region of the picture plane. Next, in step S2' it is determined whether the automatic exposure lock (AE-L) switch 58 is set ON. When the determination in step S2' is affirmative, control proceeds to step S51 where the photometry data obtained in step S1' is fixed by the exposure control device 22. Specifically, photometry data which has already been obtained is used as the photometry data and new photometry data is not obtained. It should be noted that the determination in step S2' will be affirmative when the AE-L switch 58 is set first and then a half-depression operation is performed. Next, steps S6–S8 are performed, as described previously, to provide autofocus adjustment based on visual line detection. Autofocus adjustment based on visual line detection is performed regardless the status of the AE-L switch 58. In step S52, exposure calculation is performed based upon the photometry data from the center region of the picture plane, which is fixed in step S51. The control routine then proceeds to S11, and step S11 and the following steps are performed in the same manner as described with respect to FIG. 3.

However, when it is determined in step S2' that the AE-L switch 58 is not set ON, control proceeds to step S6 and the following steps. After step S9, in step S9' it is determined whether the AE-L switch 58 is set ON. If the determination in step S9 is affirmative, control proceeds to step S51 where steps S51–S52 are performed. In step S52, exposure calculation is performed based upon the photometric data from the region selected based upon the visual line detection in step S9, which is fixed in step S51. According to the above-described steps, the selection of regions for autofocus adjustment and autoexposure control based on the visual line detection may be performed independently, not simultaneously. If the determination in step S9' is negative, control proceeds to step S10 and exposure calculation is performed in step S10 according to the values determined in step S9.

The present invention is not limited to a camera which uses silver-salt film, and may be applied to other types of cameras such as a video camera and still cameras. Further, although the above-described embodiments have been set forth with respect to a single lens reflex camera, the present invention can also be applied to a lens shutter camera type of camera or other types of cameras. Accordingly, for example, when determining the distance from the subject using an active type rangefinder device, a focus drive system may be used to drive the photographic lens based upon the detection result. The photometric system is also not limited to the ones described, and may be a so-called through the lens (TTL system) which measures the subject light through the photographic lens, or the photometric system may be an external photometric system which measures the subject light through an optical system external to the photographic lens.

It is not necessary that the photometric regions correspond 1-to-1 to the focus detection regions. Additionally, the second mode is not limited to a high-speed continuous photographic mode, and, for example, the second mode may be a low speed photographic mode or a mode other than a continuous photographic mode.

Although a few preferred embodiments of the invention have been shown and described, it will be appreciated by those skilled in the art that changes may be made in these embodiments, without departing from the principles and the spirit of the invention, the scope of which is defined in the appended claims and their equivalents.

What is claimed is:

1. A camera having visual line detection capability, comprising:

a visual line detection device to detect a visual line of a camera operator;

a mode setting device to set a self-timer mode of photography; and a control unit to inhibit an operation of the visual line detection device when the self-timer mode of photography is set by the mode setting device.

2. A camera having visual line detection capability, comprising:

a visual line detection device to detect a visual line of a photographer;

a remote control device to generate a release signal to remotely perform a release operation;

a remote control receiving unit to receive the release signal from the remote control device; and a control unit to inhibit the operation of the visual line detection device during a time period beginning from when it is possible receive a release signal from the remote control device until the release signal is generated by the remote control device.

3. A camera having visual line detection capability, comprising:

a visual line detection device to detect a visual line of a camera operator;

a mode setting device to set a focus lock mode of photography; and a control unit to inhibit an operation of the visual line detection device when the focus lock mode of photography is set.

4. A camera having visual line detection capability, comprising:

a visual line detection device to detect a visual line of a camera operator;

a mode setting device to set a continuous mode of photography; and a control unit to inhibit an operation of the visual line detection device when the continuous photography mode is set.

5. A camera having visual line detection capability, comprising:

a visual line detection device to detect a visual line of a camera operator, a mode setting device to set an automatic exposure lock mode of photography;

an automatic exposure device to perform an automatic exposure operation based on the visual line detected by the visual line detection device when the automatic exposure lock mode of photography is not set; and a control unit to inhibit automatic exposure based on the visual line detected by the visual line detection device when the automatic exposure lock mode is set.

6. A camera having visual line detection capability, comprising:

a visual line detection device to detect a visual line of a camera operator;

a release member to start a photographic operation;

a first signal generating unit to generate a first signal for starting a photographic operation when a release member is subject to a first operation;

a second signal generating unit to generate a second signal when the release member is subject to a second operation prior to the first operation;

a mode setting device to set a self-timer mode, a focus lock mode and a continuous mode of photography; and a control unit to operate the visual line detection device to perform visual line detection when the second signal is generated, and to inhibit the visual line detection device from performing visual line detection when at least one of the self-timer mode, the focus lock mode and the continuous mode of photography is set by the mode setting device.

7. The focusing system as recited in claim 6, wherein the control unit repeatedly operates the visual line detection device when the second signal is generated.

8. A focusing system for a camera, comprising:

a photographic lens;

a visual line detection device to detect a visual line of a camera operator;

a first focus detection region selection device to select a focus detection region in a photographic field according to a visual line detected by the visual line detection device;

a second focus detection region selection device to select a focus detection region in a photographic field, the focus detection region selected by the second focus detection region selection device being selected unrelated to the visual line detected by the visual line detection device;

a mode selecting device to select one of a first mode of photography and a second mode of photography;

a control unit to enable operation of the visual line detection device and the first focus detection region selection device when the first mode of photography is selected, and to inhibit operation of the visual line detection device and the first focus detection region selection device, while enabling operation of the second focus detection region selection device when the second mode of photography is selected; and a focus adjustment device to drive the photographic lens to focus on a subject in a focus detection region selected according to the mode selected by the mode selection device.

9. A camera as recited in claim 8, wherein the second mode is a continuous photography mode during which photography is performed in rapid succession during operation of the camera.

10. A camera, comprising:

a photographic lens;

a visual line detection device to detect a visual line of a camera operator;

a focus detection region selection device to select a focus detection region in a photographic field according to one of a visual line detected by the visual line detection device and unrelated to the visual line detected by the visual line detection device;

a focus adjustment device to drive the photographic lens to focus on a subject in the focus detection region selected by the focus detection region selection device;

an automatic focus adjustment determination device to determine whether automatic focus adjustment is to be performed based on the visual line detected by the visual line detection device; and a control unit to control the visual line detection device, the focus detection region selection device and the focus adjustment device to perform automatic focus adjustment based on the focus detection region selected according to the visual line detected by the visual line detection device when the automatic focus adjustment determination device determines that automatic focus adjustment is to be performed based on the detected visual line, and to control the focus adjustment device and focus detection region selection device to perform automatic focus adjustment based on a focus detection region selected unrelated to the visual line detected by the visual line detection device when the automatic focus adjustment determination device determines that automatic focus adjustment is not to be performed based on the visual line detection result.

11. A camera as recited in claim 10, wherein the photographic lens is an interchangeable lens and the automatic focus adjustment determination device further determines that automatic focus adjustment is not to be performed when a manual focus lens is installed.

12. A camera as recited in claim 10, wherein the camera includes a mode setting device to set a manual focus mode of operation, and the automatic focus adjustment device further determines that automatic focus adjustment is not to be performed when a manual focus mode is set.

13. A camera as recited in claim 10, wherein the camera includes a mode setting device to set a focus lock mode of operation, and the automatic focus adjustment device further determines that automatic focus adjustment is not to be performed when a focus lock mode of operation is set.

14. A camera as recited in claim 10, wherein the control unit inhibits operation of the visual line detection device when the automatic focus adjustment determination device determines that automatic focus adjustment is not to be performed based on the detected visual line.

15. A camera as recited in claim 10, further comprising:

a photometric device to perform photometry in a plurality of a photometric regions;

a photometric region selection device to select a photometric region according to the visual line detected by the visual line detection unit;

an exposure value calculation device to calculate an exposure value of a subject in a focus detection region selected by the focus detection region selection device based on the output of the photometric device, wherein the automatic focus detection determination device also determines whether automatic focus adjustment is not to be performed control unit inhibits the operation of the focus adjustment device and enables operation of the visual line detection device and the photometric region selection device when the automatic focus adjustment determination device determines that automatic focus adjustment is not to be performed.

* * * * *